United States Patent [19]

Levinthal et al.

[11] Patent Number: 5,472,679

[45] Date of Patent: * Dec. 5, 1995

[54] METHOD OF MAKING HYDROXYAMINE AND PRODUCTS THEREFROM

[75] Inventors: Michael L. Levinthal, Marshall, Tex.; Rodney L. Willer; Dennis J. Park, both of Newark, Del.; Ronnelle Bridges, Hallsville, Tex.

[73] Assignee: Thiokol Corporation, Ogden, Utah

[ * ] Notice: The portion of the term of this patent subsequent to Nov. 30, 2010, has been disclaimed.

[21] Appl. No.: 257,709

[22] Filed: Jun. 10, 1994

Related U.S. Application Data

[63] Continuation of Ser. No. 108,419, Aug. 19, 1993, abandoned, which is a continuation of Ser. No. 910,904, Jul. 10, 1992, Pat. No. 5,266,290.

[51] Int. Cl.$^6$ .................................................. C01B 21/20
[52] U.S. Cl. ................... 423/387; 203/36; 203/37
[58] Field of Search ............................ 423/387; 203/36, 203/37

[56] References Cited

U.S. PATENT DOCUMENTS

| | | | |
|---|---|---|---|
| 3,856,924 | 12/1974 | Kartte et al. | 423/387 |
| 4,066,736 | 1/1978 | Liggett | 423/387 |
| 4,507,248 | 3/1985 | Mathew et al. | 423/387 |
| 4,551,323 | 11/1985 | Mathew et al. | 423/387 |
| 4,551,324 | 11/1985 | Mathew et al. | 423/387 |
| 4,707,294 | 11/1987 | Mathew et al. | 423/387 |
| 4,778,669 | 10/1988 | Fuchs et al. | 423/387 |
| 4,851,125 | 7/1989 | Dotson et al. | 423/387 |
| 4,889,704 | 12/1989 | Fuchs et al. | 423/387 |
| 4,956,168 | 9/1990 | Wagaman | 423/387 |
| 5,213,784 | 6/1992 | Cawlfield | 423/387 |
| 5,266,290 | 11/1993 | Levinthal et al. | 423/387 |

FOREIGN PATENT DOCUMENTS

| | | |
|---|---|---|
| 108294 | 5/1984 | European Pat. Off. . |
| 266187 | 5/1988 | European Pat. Off. . |
| 266059 | 5/1988 | European Pat. Off. . |
| 287952 | 10/1988 | European Pat. Off. . |
| 2206270 | 7/1974 | France . |
| 2243904 | 4/1975 | France . |
| 2602802 | 2/1988 | France . |
| 7009685 | 1/1972 | Netherlands . |
| 1423886 | 2/1976 | United Kingdom . |
| 1427689 | 3/1976 | United Kingdom . |
| 2211858 | 7/1989 | United Kingdom . |

OTHER PUBLICATIONS

J. W. Mellor, *Inorganic and Theoretical Chemistry*, vol. VIII, p. 284 (1953).

Chang et al, "Conversion of Hydroxylamine Hydrochloride to Hydroxylamine Nitrate by Electrodialysis and Water–Splitting Processes", Ind. Eng. Chem. Process Des. Dev., vol. 20, No. 2 (1981).

Tyron, "Hydroxylamine Salts", Inorganic Synthesis, vol. III: 35 (1950).

Durrant et al, "Introduction to Advanced Inorganic Chemistry", 719–721 (2nd. Ed. 1970).

Wheelright, "Cation–Exchange Conversion of Hydroxylamine Sulfate to Hydroxylamine Nitrate", Ind. Eng. Chem. Process Des. Dev., vol. 16, No. 2, 1977, pp. 220–222.

Calmon, "Explosion Hazards of Using Nitric Acid in Ion–Exchange Equipment", Chemical Eng., (1990), pp. 271–274.

Hurd, "Hydroxylamine", Inorganic Synthesis, vol. 1, 1939, pp. 87–89.

Hurd et al., "The Preparation of Free Hydroxylamine", vol. 47, 1925, pp. 67–69.

Katzakian et al., Emulsion Propellant Interim Report, AL–TR–89–052, Air Force Contract F04611–86–C–0085 (Dec. 1989).

Vutekakis et al., Synthesis of Hydroxyl Ammonium Nitrate by an Electrochemical Method, Contract Report BRL–CR–581, Contract No. DAAA–86–K–0024 (Jan. 1987).

*Primary Examiner*—Wayne Langel
*Attorney, Agent, or Firm*—Ronald L. Lyons; Madson & Metcalf

[57] ABSTRACT

The present invention concerns a method for making energetic oxidizer salts and solutions thereof, and in particular relates to processes for making aqueous solutions of hydroxylammonium nitrate in high purity suitable for use in making liquid gun propellants. The present alcohol-free process yields high purity alcohol-free hydroxylammonium nitrate by neutralizing an aqueous nitric acid solution (20–70% wt./wt.) with an alcohol-free aqueous hydroxylamine solution at temperatures ranging from above −50° C. to substantially less than ambient (20° C.) to produce the desired alcohol-free aqueous hydroxylammonium nitrate solution in a usable concentration and in high purity. The process is economical, environmentally acceptable, and facile.

14 Claims, No Drawings

METHOD OF MAKING HYDROXYAMINE AND PRODUCTS THEREFROM

RELATED APPLICATION

This application is a continuation of application Ser. No. 08/108,419, filed Aug. 19, 1993, abandoned, which is a continuation of application Ser. No. 07/910,904, filed Jul. 10, 1992, which has now issued as U.S. Pat. No. 5,266,290.

FIELD OF THE INVENTION

The present invention relates to a process for making alcohol-free aqueous solutions of hydroxylammonium salts, and in particular relates to a novel chemical process for making alcohol-free impurity-free aqueous hydroxylammonium nitrate solutions.

BACKGROUND OF THE INVENTION

Hydroxylammonium nitrate is useful as a reducing agent in re-processing spent nuclear fuel, as an energetic oxidizer salt for use in liquid gun propellants, hybrid rocket motors, solution propellants and as a reagent for preparing various industrial, specialty and pharmaceutical chemicals.

It has previously been reported in the literature that commercially available solutions of hydroxylammonium nitrate may be quite dilute, oftentimes being shipped in inert containers at a maximum concentration of 24 percent.

Various methods for preparing hydroxylammonium nitrate have been proposed over the years. These processes suffer from various drawbacks from a commercial, safety and/or technical perspective.

Several of the known processes for preparing hydroxylammonium nitrate have inadequate product yields, have impurity laden products, and/or present problems in accurately controlling the concentration of the desired salt. For instance, one known electrolytic process for making hydroxylammonium nitrate has the undesirable environmental characteristic of utilizing significant amounts of mercury. As a consequence, the hydroxylammonium nitrate may contain a residual amount of mercury, and extensive mercury contamination can occur if the electrolysis cell should rupture. The process is quite expensive and it has been said that it is difficult to obtain consistent concentrations of the desired product. Further, the process apparently does not produce hydroxylammonium nitrate in sufficient concentration for direct use in making liquid gun propellants, and requires concentrating the hydroxylammonium nitrate solution.

An electrochemical process using a mercury cathode in an electrolysis cell is described in French Patent 2,602,802 (1988).

Earlier efforts involving electrodialysis with hydroxylammonium sulfate or its chloride and nitric acid using an ion exchange membrane to produce hydroxylammonium nitrate are described in French Patent Application 2,243,904 and in *Ind. Eng. Chem. Process Des. Dev.* 20:361 (1981). In this method, hydroxylammonium nitrate is produced from hydroxylammonium sulfate or hydrochloride by an electrolysis method which uses cation and anion exchange resins and a double decomposition reaction. Four different types of fluids are passed through four chambers of an electrodialysis tank having the chambers in one block but partitioned alternately by cation exchange membranes and anion exchange membranes. The hydroxylammonium nitrate is drawn out of one of the four chambers. The process is complicated, and commercially not very attractive because it requires four units of fluid circulating pipes, direct current power sources, and auxiliary facilities, and productivity is low. Further, the available membrane surface area is limited.

A process for continuously converting a hydroxylammonium salt, such as the sulfate salt, to another hydroxylammonium salt, such as hydroxylammonium nitrate or hydroxylammonium formate, by counter-current liquid extraction, using a so-called cationic solvent is described in French Patent 2,206,270 (1974).

Conversion of hydroxylammonium sulfate into hydroxylammonium nitrate has been proposed using a cation exchange resin. *Ind. Eng. Chem Process Des. Dev.* 16:220 (1977). In this method, a sulfate is converted into a corresponding nitrate using a cation exchange resin in which the hydroxylammonium ion in the hydroxylammonium sulfate is carried on a cation exchange resin and then eluted with a nitric acid solution. This method is a quite complicated batch process and there is a danger of explosion by the reaction between the cation exchange resin and the nitric acid. *Chem. Eng. Nov.* 17:271 (1980). The hydroxylammonium nitrate solution produced is extremely dilute.

Hydroxylamine nitrate can be produced by combining NO and $H_2$ gases in the presence of a platinum catalyst, German Offenlegunschrift 2,100,036, or by hydrogenating nitric acid in the presence of a special palladium catalyst, Dutch patent application 7,009,685. Another process for preparing a hydroxylammonium salt by the catalytic reduction of nitrogen monoxide with hydrogen at elevated temperature in a dilute aqueous solution of a mineral acid and in the presence, in suspension, of a particular supported platinum catalyst is disclosed in Europe 287,952 (1988). The processes for producing hydroxylammonium nitrate wherein nitrous oxide or nitric acid is hydrogenated in the presence of the specified catalyst requires the use of dangerous hydrogen and, in the other case, nitrous oxide. The processes require a special catalyst which must be periodically replaced or regenerated. Catalyst regeneration is complicated and expensive.

The stoichiometric reaction of a boiling saturated barium nitrate solution with hydroxylammonium sulfate yields a dilute solution of hydroxylammonium nitrate. The maximum concentration of hydroxylammonium nitrate obtained is about 20%. However, concerns about product stability often mean the reaction is conducted at lower temperatures which results in a reduced product concentrations on the order of 15%. Further, unless the barium nitrate salt is dissolved prior to admixture with hydroxylammonium sulfate, results are erratic and considerable amounts of barium salt remain unreacted.

Another barium nitrate based process for making hydroxylammonium nitrate is described in U.S. Pat. No. 4,066,736. As the processes described, a hydroxylammonium salt, such as hydroxylammonium sulfate, is slowly added to a well agitated slurry of barium nitrate whereby the hydroxylammonium salt goes into solution and reacts with the dissolved barium salt but does not directly contact the slurried barium nitrate. Effective agitation must be maintained, otherwise direct contact between the slurried barium nitrate and the hydroxylammonium salt occurs whereby the once soluble slurried salt will receive an insoluble barium sulfate coating which causes the reaction to terminate prematurely. The insoluble by-product, barium sulfate, must be separated from the hydroxylammonium nitrate. This may present handling, separation and disposal problems.

Europe 108,294 (1984) describes preparation from solid hydroxylammonium sulfate of alcoholic hydroxylamine solutions, and of oximes, hydroxamic acids and other hydroxylammonium salts via alcoholic hydroxylamine solutions. Among the methods disclosed is one for preparing hydroxylammonium nitrate which involves preparing and stirring a methanolic solution of sodium methoxide and hydroxylamine sulfate in an ice bath, filtering the thus obtained slurry, mixing the clear methanolic filtrate with cake-wash and with concentrated $H_2SO_4$ to pH 8.0, filtering-off the thus produced white solid, and adding conc. $HNO_3$, while chilling and stirring, to the filtrate whereby hydroxylammonium nitrate in methanolic solution is said to be obtained.

Another dialysis method, which is described in Europe 266,059 (1988), involves providing a dialysis unit comprising a tank divided into chambers by a cation exchange resin, such as styrene and divinyl benzene, placing an aqueous solution of hydroxylamine sulfate and a solution of nitric acid in adjacent chambers, and allowing the hydroxylammonium ions and hydrogen ions to pass through the membrane whereby the nitric acid is converted to the desired hydroxylamine nitrate.

A method for preparing hydroxylamine salts is described in U.S. Pat. No. 4,956,168 in which a slurry of hydroxylamine sulfate in alcohol at a temperature not exceeding 65° C. is prepared, a hydroxylamine-alcohol solution and ammonium sulfate are then prepared by high-shear mixing ammonia with the slurry at $\leq 650°$ C., the ammonium sulfate is removed by filtration, the solution is agitated, and nitric acid is admixed under vigorous agitation with the solution at about $\leq 50°$ C. and preferably not below 20° C., and the desired hydroxylamine salt is recovered.

Low concentrations of aqueous hydroxylammonium nitrate solutions may pose obstacles in the effective use of hydroxylammonium nitrate in certain applications such as, for instance, a liquid gun propellant and in making pharmaceutical or other specialty chemicals. Accordingly, efforts to find suitable means for concentrating solutions of hydroxylammonium nitrate have been made. However, it has been stated that concentration of solutions containing hydroxylammonium nitrate by techniques which require heating, such as distillation or evaporation, are not desired because decomposition of the product may result.

One effort to provide a suitable process for concentrating dilute aqueous solutions of hydroxylammonium salts, including hydroxylammonium nitrate, is disclosed in U.S. Pat. No. 4,851,125. This processes involves concentrating the hydroxylammonium nitrate salt solution through contact with a membrane having a sorption side and a desorption side, and comprises contacting the dilute salt solution with the sorption side of a membrane to sorb the solvent and permit the solvent to flow through the membrane to the desorption side, and desorbing the solvent from the desorption side of the membrane. This process does not address the underlying problem of providing an economical, environmentally acceptable and technically facile process for manufacturing hydroxylammonium nitrate.

Accordingly, there has been a long standing need for a less capital intensive and facile process for producing hydroxylammonium nitrate solutions sufficiently pure and concentrated for direct use in energetic compositions and in syntheses of pharmaceutical or specialty chemicals.

SUMMARY OF THE INVENTION

The present novel alcohol-free process for preparing high purity concentrated hydroxylammonium nitrate is economical, environmentally acceptable, and technically facile. Neutralizing nitric acid (70 wt. %) with an alcohol-free aqueous hydroxylamine solution having a concentration of at least about 70 wt. % hydroxylamine under low temperatures produces the desired aqueous hydroxylammonium nitrate solution.

Distilling hydroxylamine from an alcohol-free aqueous hydroxylamine solution under low pressure at a temperature less than about 65° C., and neutralizing nitric acid (70 wt. %) with the distilled hydroxylamine solution at a temperature not greater than about 30° C. produces an alcohol-free aqueous hydroxylammonium nitrate solution having a sufficiently high concentration and purity for the economic manufacture of liquid gun propellants.

Neutralizing an aqueous hydroxylammonium sulfate solution with at least one alkali or alkaline earth metal oxide or hydroxide, distilling the thus produced hydroxylamine solution under low pressure at a temperature of less than about 65° C., and neutralizing nitric acid (70 wt. %) with the distilled hydroxylamine solution at temperatures not greater than 30° C. produces an alcohol-free aqueous hydroxylammonium nitrate solution having a sufficiently high concentration and purity for the economic manufacture of liquid gun propellants.

DETAILED DESCRIPTION OF THE INVENTION

The present process comprises neutralizing nitric acid/water (up to about 70 wt. % $HNO_3$) with an alcohol-free aqueous hydroxylamine solution at low temperatures and recovering hydroxylammonium nitrate (HAN), solid or in alcohol-free aqueous solution form, following the neutralization. Such mercury-free HAN solutions are at least as pure and as concentrated as the HAN solutions now available for the manufacture of liquid gun propellants while being produced at far less cost.

An aqueous alcohol-free hydroxylamine solution is distilled under low pressure conditions (less than about 50 mm Hg) at a temperature of $\leq 650°$ C., the hydroxylamine solution is condensed, and the hydroxylamine is added to concentrated nitric acid (70 wt. %) at a temperature not greater than about 30° C. whereby an essentially impurity-free and alcohol-free aqueous hydroxylammonium nitrate solution is obtained.

The alcohol-free aqueous hydroxylamine solution can, if desired, be generated by neutralizing hydroxylammonium sulfate ("HAS") with an effective amount of at least one inorganic base selected from the group consisting of alkali metal hydroxides, alkali metal oxides, alkaline earth oxides, and alkaline earth hydroxides. Exemplary hydroxides include, for instance, sodium hydroxide, potassium hydroxide, magnesium hydroxide, and calcium hydroxide. Sodium hydroxide is preferred. Suitable exemplary oxides include, among others, sodium oxide, magnesium oxide, calcium oxide. The thus obtained aqueous hydroxylamine solution is preferably filtered to remove any insolubles, such as alkali metal or alkaline earth metal sulfates. Then the filtered aqueous solution is purified, such as by distillation under reduced pressure at a suitable temperature, such as $\leq 65°$ C. to obtain a purified aqueous hydroxylamine solution (16–23 wt. % hydroxylamine). A nitric acid/water solution ($\leq 70\%$ wt./wt.) is then neutralized with the proper amount of the distilled aqueous hydroxylamine solution whereby an essentially impurity-free alcohol-free aqueous hydroxylammonium nitrate solution is obtained. The impurity-free and alcohol-free aqueous hydroxylammonium nitrate solution is suitable for such demanding uses as liquid gun propellants.

A saturated aqueous hydroxylammonium sulfate solution can be made by methods which are known to those skilled in this art. Suitable concentrations of hydroxylammonium sulfate range from above about 1.25 molar up to about 4–5 molar, although 2.5 molar is preferred. The concentration is selected to insure the maximum amount of the hydroxylammonium sulfate reacts with the inorganic base so as to obtain the desired hydroxylamine and to keep the maximum desired concentration of hydroxylamine in the distillate. The HAS solution may be prepared at any suitable temperature, although pragmatic considerations imply a temperature range of 15° C. to 25° C. An alcohol-free saturated HAS solution at 20° C. will comprise approximately 68.5 grams HAS per 100 mls water.

The neutralization of the hydroxylammonium sulfate solution may be conducted at varying temperatures such as, for instance, up to about 60° C., but is preferably conducted at lower temperatures such as up to about 25°–30° C. Useful results have been obtained at 3°–7° C. Decomposition of hydroxylamine is not desired.

The concentration of the alcohol-free aqueous hydroxylamine solution is directly related to the concentration of the aqueous hydroxylammonium nitrate solutions produced by the present processes. Suitable concentrations of hydroxylamine range from 10% to about 50% (wt % hydroxylamine), and particularly from about 10 wt % to about 30 wt. %, more particularly from 10 wt. % to 25 wt. %, and most particularly from about 16 wt. % to about 23 wt. %. However, the more concentrated the aqueous hydroxylamine solution, the more concentrated is the hydroxylammonium nitrate solution. To obtain hydroxylammonium nitrate in high purity, the starting materials, such as the hydroxylamine solution, should be substantially impurity-free. In particular, the presence of iron or ions thereof are undesired. The starting materials may be further purified, if, for instance, the hydroxylammonium nitrate end product will be used in a liquid gun propellant. An exemplary commercially available aqueous hydroxylamine solution is said to contain 50% free hydroxylamine in water, 50 ppm max. of sulfate, 1 ppm max of iron, 2 ppm max of lead, 50 ppm ash.

The hydroxylamine solution is distilled under low pressure conditions, i.e. reduced pressure, preferably vacuum conditions at a temperature of not greater than about 65° C., advantageously 40°–60° C. and particularly 40°–50° C. As contemplated herein, low pressure refers to less than about 50 mm Hg, preferably 10–20 mm Hg. The distillation of the aqueous hydroxylamine solution permits production of alcohol-free impurity-free aqueous hydroxylammonium nitrate solutions suitable for the manufacture of storage-stable liquid gun propellants having consistent combustion results.

The nitric acid concentration can be varied across a concentration range, and may be adjusted based on the temperature conditions desired and which prevail during the neutralization step. Suitable nitric acid concentrations (nitric acid/water, wt./wt.) may range from about 20% to about 70%.

The nitric acid neutralization step may be conducted at cryogenic temperatures ranging from slightly above −50° C. up to not greater than about 30° C., and advantageously not greater than about 25° C. The neutralization step may be conducted in the range of −450° C. to +20° C., and may be conducted at less than about +10° C., such as less than about +5° C. The temperature is selected to minimize and, if possible, avoid the formation of undesired by-products and/or the decomposition of hydroxylamine.

During the neutralization step, decomposition of the hydroxylammonium nitrate can be avoided by adding the aqueous hydroxylamine solution to (into) the nitric acid. The addition is preferably conducted such that the solutions are chemically mixed with vigorous agitation. For instance, the alcohol-free aqueous hydroxylamine solution may first be passed through a cooled heat exchanger, and thereafter the nitric acid may be neutralized by controlling the amount of and rate at which the thus cooled alcohol-free aqueous hydroxylamine solution is added to the nitric acid. The hydroxylamine solution may be added to the nitric acid using a mixing tee. The thus obtained neutralization solution is further vigorously agitated using suitable available means, such as a stirred reactor or an in-line agitator.

The temperature, nitric acid concentration, and purity of the aqueous hydroxylammonium nitrate solutions appear to be interrelated. It is theorized that there may be a slight interaction between the concentration (wt. %) hydroxylamine added and the concentration (wt. %) nitric acid used. For example, at −4° C., neutralizing 70% nitric acid/water (wt./wt.) with unpurified aqueous hydroxylamine (50 wt. % hydroxylamine from Howard Hall International) resulted in fume-off and generated $NO_x$ fumes, whereas at −45° C. neutralizing 60% nitric acid/water (wt./wt.) with the unpurified aqueous hydroxylamine solution (50% hydroxylamine from Howard Hall International) was facilely conducted. However, nitric acid (50 wt. % $HNO_3$) may be neutralized with a purified aqueous hydroxylamine solution (45–48 wt. %) at temperatures of up to about 20° C., with hydroxylamine decomposition occurring at greater than about 30° C. and being complete at about 40° C.

The process is conducted in water. Non-aqueous solvents are undesired. In particular, the process is at least substantially, if not essentially, alcohol-free. The presence of relatively significant amounts of alcohol may result in nitrate ester formation and contamination of the hydroxylammonium nitrate solution. Such contamination may have a deleterious effect on a liquid gun propellant composition. The absence of alcohol also avoids the need to separate the alcohol from the hydroxylamine and hydroxylammonium nitrate. The process also does not require or contemplate the addition of ammonia as such.

The molarity of the hydroxylammonium nitrate solution obtained in accordance with this process embodiment is reasonably predictable from the ratio of hydroxylamine/nitric acid/water used, with a error of about ±0.13 moles/liter hydroxylammonium nitrate/water.

The moles of nitric acid remaining is reasonably predictable from the moles hydroxylamine to moles nitric acid present. Zero percent nitric acid remaining in the hydroxylammonium nitrate solution has been obtained, but is not preferred. The pH of the hydroxylammonium nitrate solution is adjusted to a pH of about 1.0 to about 1.5, and preferably to a pH less than or equal to 1.3, in order to confer the desired stability on such solutions.

Alcohol-free aqueous hydroxylammonium nitrate solutions are obtainable in accordance with the present invention which are suitable for use in making liquid gun propellants. Such alcohol-free aqueous hydroxylammonium nitrate solutions are sufficiently iron-free for use in such energetic applications. The presence of iron is not desired. The iron content is typically less than about 1 ppm Fe.

Liquid gun propellants comprising energetically effective amounts of hydroxylammonium nitrate and triethanol ammonium nitrate in water can be obtained by further concentrating the hydroxylammonium nitrate solutions obtained in accordance with the present invention followed by addition of triethanolamine and nitric acid according to available known procedures.

By way of example, and not limitation, the following examples are given.

EXAMPLES

In the Examples and in Table I, HA means hydroxylamine, HAS means hydroxylammonium sulfate, and HAN means hydroxylammonium nitrate. The mole ratios reported for Examples 2–14 were calculated based on 50 wt. % HA and 70 wt % $HNO_3$. The starting materials used in Examples 8–20 were not analyzed for exact concentration. De-ionized and distilled water was used in the Examples.

Example 1

In a round-bottom flask was placed an aqueous hydroxylamine solution (66.36 grams, 50 wt. % HA, commercial grade from Howard Hall International). That solution was distilled with a rotary evaporator under vacuum (25mm Hg) at 57° C. to 60° C. until the flask was dry (about 30 minutes). The recovered solution (64.82 grams) contained hydroxylamine (46.0 wt % HA).

To a half-liter round-bottom flask equipped with a stirrer bar and thermocouple were added conc. $HNO_3$ (45.0 grams, 70 wt. %) while the flask was kept in an isopropyl alcohol/ice bath (−4° C.). To another flask in an ice/water bath was added a portion of the distilled hydroxylamine solution (35.0 grams, 46.0 wt. % HA). The chilled distilled aqueous hydroxylamine solution was metered, dropwise, to the round-bottom flask containing $HNO_3$ while stirring. During the neutralization, the temperature in the round-bottom flask rose from −7° C. to about 0° C. when the nitric acid was neutralized. The product solution (79.3 grams) has a pH of 3. To the product solution was added additional conc. $HNO_3$ (70 wt. % $HNO_3$) to obtain pH 1.3.

The product solution contained 59.7 wt. % HAN.

Example 2

In a round-bottom flask was placed an aqueous hydroxylamine solution (101.81 grams, 50 wt. % HA, commercial grade from Howard Hall International). That solution was distilled with a rotary evaporator under vacuum (25 mm Hg) at 60° C. until the flask was dry. The recovered solution (101.01 grams) contained hydroxylamine (45.0 wt % HA).

To a conc. nitric acid solution (45.0 grams, 70 wt. % $HNO_3$) was added distilled water (18.0 grams) to obtain a nitric acid solution (63.0 grams, 50 wt. %).

In a 100 mls three-neck round-bottom flask equipped with a thermocouple and magnetic stirrer and cooled in an ice bath at 0° C. was placed a portion of the above-prepared nitric acid (12.6 grams, 50 wt. % $HNO_3$). To another flask was placed a portion of the above-prepared distilled aqueous hydroxylamine solution (7.34 grams, 45 wt. % HA), and the flask and its contents were chilled. To the nitric acid-containing flask was controllably and slowly added the chilled aqueous hydroxylamine solution. The initial nitric acid temperature was 0° C. The hydroxylamine was added at such a rate to attain and maintain the desired target neutralization temperature of about 8°–10° C. The product solution (19.8 grams) has a pH of 4. To the product solution was added additional $HNO_3$ (50 wt. % $HNO_3$) to obtain pH 1.3.

The product solution contained 48.8 wt. % HAN.

Example 3

In a 100 mls. three-neck round-bottom flask equipped with a thermocouple and magnetic stirrer and cooled in an ice bath at 0° C. was placed a portion of the above-prepared nitric acid (12.6 grams, 50 wt. % $HNO_3$, Example 2). To another flask was placed a portion of the distilled aqueous hydroxylamine solution (7.34 grams, 45 wt. % HA, Example 2). To the nitric acid-containing flask was controllably and slowly added the chilled aqueous hydroxylamine solution. The initial nitric acid temperature was 2° C. The hydroxylamine was added at such a rate to attain and maintain the desired target neutralization temperature of up to about 20° C. During the neutralization the temperature was maintained between 17°–200° C. The product solution (19.9 grams) had a pH of 3. To the product solution was added additional nitric acid to obtain pH 1.3.

The product solution contained 49.0 wt. % HAN.

Example 4

In a 100 mls. three-neck round-bottom flask equipped with a thermocouple and magnetic stirrer and placed in a cool water bath was placed a portion of the above-prepared nitric acid (12.6 grams, 50 wt. % $HNO_3$, Example 2). To another flask was placed a portion of the distilled aqueous hydroxylamine solution (7.34 grams, 45 wt. % HA, Example 2). To the nitric acid-containing flask was controllably and slowly added the chilled aqueous hydroxylamine solution. The initial nitric acid temperature was 2° C. The hydroxylamine was added at such a rate to attain and maintain the desired target neutralization temperature of up to about 30° C. During the neutralization the temperature was maintained between 29°–30° C. The product solution (19.62 grams) had a pH of 1.

The product solution contained 48.0 wt. % HAN.

Example 5

To water (75 mls) was added hydroxylammonium sulfate (82.0 grams) at a temperature of 22° C. to obtain a saturated aqueous hydroxylammonium sulfate solution. To the thus obtained solution was slowly added sodium hydroxide (80.0 grams 50 wt. % NaOH). The temperature was initially 3° C. but rose to a temperature of 11° C. during the NaOH addition. The solution was cooled to below 5° C. and filtered. The recovered wet solid material (136.1 grams) was set aside. To the cold liquid (98.9 grams) containing hydroxylamine was added ascorbic acid (0.3 grams). The cold liquid was then treated in a rotary evaporator until a residue (14.55 grams) was obtained and a liquid product (80.05 grams) was obtained. The liquid product contained HA (16.0 wt. HA, 0.39 mole HA).

In an isopropyl alcohol/ice bath a 500 ml. round-bottom flask was set up with a magnetic stirring bar and thermocouple. To the round bottom flask was added conc. nitric acid (70% wt./wt., 35.1 grams, 0.39 mole $HNO_3$). To the nitric acid was slowly and controllably added a portion of the purified HA-containing liquid product (80.0 grams, 0.39 mole, 16 wt. % HA, pH 10) at −6° C. The temperature rose to −1° C. After about 2 hours the neutralization was completed. To the neutralization solution was added additional nitric acid to reduce the pH from 4 to 1.3. The thus treated neutralization solution (114.0. grams) was transferred to a 250 ml. Erlenmeyer flask. The neutralization solution contained about 33 wt. % HAN.

Example 6

To water (200 mls) was added hydroxylammonium sulfate (82.0 grams) at a temperature of 22° C. to obtain an aqueous hydroxylammonium sulfate solution. To the thus obtained solution was slowly added sodium hydroxide (80.0 grams, 50 wt. % NaOH). The temperature was initially 3° C. but rose to a temperature of 7° C. during the NaOH addition. The solution was cooled to below 5° C. and filtered. The recovered wet solid material was then washed with cold distilled water (50 mls) and added to the filtrate resulting in 288.0 grams of liquid and 113.4 grams of precipitate. To the cold liquid (288.0 grams) containing hydroxylamine was added ascorbic acid (0.3 grams). The cold liquid was then treated in a rotary evaporator until a residue (23.6 grams) was obtained and a liquid product (257.11 grams) was obtained. The liquid product contained HA (10.0 wt. HA, 0.39 mole HA).

A 23.0 wt. % HAN solution is obtained using a portion of the just-prepared HA solution (10 wt. % HA) to neutralize conc. nitric acid (70.2 grams, 70 wt. %) according to the procedure of Example 5.

Example 7

To a 500 mls. 3-neck round-bottom flask hydroxylammonium sulfate (82.0 grams, 0.5 mol) and distilled water (200 mls.) were added at 22° C. When the addition was complete, the solution was cooled in an ice bath to about 3° C. To the cooled solution was slowly added sodium hydroxide (80.0 grams, 1.0 mol, 50 wt. % NaOH) while maintaining the reaction temperature between 3°–10° C. When the sodium hydroxide addition was completed, the solution was cooled to less than 5° C. and filtered. The resulting precipitate was washed with 50 mls of cold distilled water and added to the filtrate to obtain a liquid (289.4 grams) and precipitate (115.9 grams). To the thus obtained liquid was added 0.15 gram of ascorbic acid. The thus stabilized liquid was then distilled using a rotary evaporator at about 25mm Hg at about 57°–60° C. with the condenser column being maintained at less than 0° C. A distilled liquid (263.9 grams) and residue (24.4 grams) were obtained.

Hydroxylamine analysis indicated HA (11.1 wt. %) The hydroxylamine used to neutralize the nitric acid, with a percent yield of 88.6%

Example 8

In a 100 mls. three-neck round-bottom flask equipped with a thermocouple and magnetic stirrer and placed in a water bath was placed a portion of the above-prepared nitric acid (12.6 grams, 50 wt. % $HNO_3$, Example 2). To another flask was placed a portion of the distilled aqueous hydroxylamine solution (7.34 grams, 45 wt. % HA, Example 2). To the nitric acid-containing flask was controllably and slowly added the chilled aqueous hydroxylamine solution. The initial nitric acid temperature was 23° C. The hydroxylamine was added at such a rate to attain and maintain the desired target neutralization temperature of 30°–40° C. During the neutralization the temperature was maintained between 32°–40° C. Evolution of yellowish colored gas from the neutralization solution was observed. Violent fizzing and bubbling were also observed during the neutralization. The product solution (16.1 grams) has a pH $\leq 1$.

The product solution contained 1.5 wt. % HAN.

Examples 9–21

Neutralizations were performed by neutralizing varying concentrations of nitric acid in a stirred flask at various low temperatures by controllably adding, dropwise, unpurified aqueous hydroxylamine solution (50% HA, commercial grade, Howard Hall International).

The molar concentrations of hydroxylammonium nitrate and $HNO_3$ in the hydroxylammonium nitrate solutions produced in accordance with Examples 9–21 were determined from pH titration curves. The equivalence point was determined by plotting a titration curve (mls. titrant versus pH) and the concentration of the desired species was then calculated. The pH determinations were made using an Orion Digital pH meter and, as reagents, 0.2M n-butylamine, benzoic acid, methanol, and 1% phenolphthalein solution. The general technique and principle are described in Sasse, Analysis of Hydroxylammonium Nitrate-Based Liquid Propellants, Tech. Report No. BRL-TR-3154 (September 1990) and Decker et al, Titrimetric Analyses of HAN-Based Liquid Propellants, Tech. Report (BRL June 1986).

Example 22

A neutralization was performed by adding an undistilled aqueous hydroxylamine solution (1.37 grams, 50% HA, commercial grade, from Howard Hall International) dropwise to conc. nitric acid (1.31 grams, 70% $HNO_3$) in a stirred flask set in an ice bath at 4° C. The addition of a drop of hydroxylamine solution resulted in fume-off, generating considerable $NO_x$ fumes, with no apparent production of hydroxylammonium nitrate.

TABLE I

| Ex | % Nitric | Molar Ratio HA/HNO$_3$ | React. Temp. (°C.) | Grams HA + Water Used | Grams Nitric + Water Used | Moles Nitric Rem. | Mol/L [HAN] In Soln. | Final pH |
|---|---|---|---|---|---|---|---|---|
| 1 | 70 | 1.0 | −7 to 0 | 35.9 | 45.0 | 0.00 | 8.22 | 1.3* |
| 9 | 10 | 1.10 | −4 | 6.34 | 55.03 | 0.00 | 1.57 | 5.1** |
| 10 | 20 | 0.90 | −4 | 15.56 | 82.55 | 0.43 | 2.93 | 1.4** |
| 11 | 20 | 0.95 | −4 | 8.22 | 41.28 | 0.28 | 3.09 | 1.5** |
| 12 | 20 | 1.00 | −4 | 17.32 | 82.55 | 0.10 | 2.93 | 1.5** |
| 13 | 20 | 1.00 | −4 | 17.32 | 82.55 | 1.26 | 2.88 | 2.1** |
| 14 | 20 | 1.05 | −4 | 9.08 | 41.28 | 0.03 | 2.83 | 3.9** |
| 15 | 20 | 1.10 | −4 | 19.02 | 82.55 | 0.00 | 2.83 | 5.4** |
| 16 | 35 | 1.00 | −4 | 5.77 | 15.72 | 0.13 | 5.26 | 1.6** |
| 17 | 45 | 1.10 | −4 | 19.02 | 36.69 | 0.00 | 6.07 | 5.2** |
| 18 | 50 | 1.05 | −4 to +2 | 6.05 | 11.01 | 0.05 | 6.68 | 2.5** |
| 19 | 50 | 1.10 | −4 to +2 | 19.02 | 33.02 | 0.00 | 6.58 | 5.0** |
| 20 | 50 | 1.05 | −46 to −30 | 6.05 | 11.01 | 0.05 | 6.58 | 4.3** |
| 21 | 60 | 1.05 | −45 to −35 | 4.54 | 6.88 | 0.08 | 7.69 | 2.4** |

TABLE I-continued

| Ex | % Nitric | Molar Ratio HA/HNO$_3$ | React. Temp. (°C.) | Grams HA + Water Used | Grams Nitric + Water Used | Moles Nitric Rem. | Mol/L [HAN] In Soln. | Final pH |
|---|---|---|---|---|---|---|---|---|

*pH adjusted from 3.0 to 1.3 by addition of further HNO$_3$
**pH of the titrate (alcoholic solution of HAN)

What we claim is:

1. A process for preparing an aqueous hydroxylamine solution which is alcohol-free comprising:
   (a) obtaining an alcohol-free aqueous solution of hydroxylammonium sulfate,
   (b) mixing said aqueous solution of hydroxylammonium sulfate and an effective amount of at least one inorganic base selected from the group consisting of alkali metal oxides, alkali metal hydroxides, alkaline earth metal oxides, and alkaline earth metal hydroxides whereby an alcohol-free aqueous solution containing hydroxylamine is obtained, and
   (c) distilling said alcohol-free aqueous solution containing hydroxylamine at a temperature of less than about 65° C. whereby a distillate consisting essentially of an aqueous hydroxylamine solution is obtained.

2. A process according to claim 1 wherein said distillation is conducted at 40°–60° C. at a pressure of less than 50 mm Hg.

3. A process according to claim 2 wherein said distillation is conducted at 40°–50° C.

4. A process according to claim 1 wherein the concentration of said hydroxylamine solution is 10 wt. % to 50 wt. %.

5. A process according to claim 1 wherein the concentration of said hydroxylamine solution is 10 wt. % to 25 wt. %.

6. A process according to claim 1 wherein the concentration of said hydroxylamine solution is 16 wt. % to 23 wt. %.

7. A process according to claim 1, wherein solids are removed from the solution containing hydroxylamine in (b) before conduction the distilling step (c).

8. A process according to claim 1, wherein said inorganic base is selected from the group consisting of sodium hydroxide, potassium hydroxide, magnesium hydroxide, calcium hydroxide, sodium oxide, sodium oxide, magnesium oxide, calcium oxide and mixtures thereof.

9. A process according to claim 1, wherein said inorganic base is selected from the group consisting of sodium hydroxide, potassium hydroxide, magnesium hydroxide and calcium hydroxide.

10. A process according to claim 1, wherein said inorganic base is sodium hydroxide.

11. A process according to claim 1, wherein the mixing is conducted at a temperature of 3° C. to 60° C.

12. A process according to claim 1, wherein the mixing is conducted at a temperature of about 25° C. to about 30° C.

13. A process according to claim 1, wherein the mixing is conducted at a temperature of about 3° C. to about 60° C., the inorganic base is selected from the group consisting of alkali metal hydroxide and alkaline metal hydroxide.

14. A process according to claim 11, wherein said inorganic base is selected from the group consisting of sodium hydroxide, potassium hydroxide, magnesium hydroxide and calcium hydroxide.

\* \* \* \* \*